United States Patent [19]

Namekawa

[11] Patent Number: 4,945,556
[45] Date of Patent: Jul. 31, 1990

[54] METHOD OF LOCKING FUNCTION OF MOBILE TELEPHONE SYSTEM

[75] Inventor: Makoto Namekawa, Iwaki, Japan

[73] Assignee: Alpine Electronics Inc., Japan

[21] Appl. No.: 270,423

[22] Filed: Nov. 9, 1988

Related U.S. Application Data

[63] Continuation of Ser. No. 102,254, Sep. 28, 1987, abandoned, which is a continuation of Ser. No. 881,905, Jul. 3, 1986, abandoned.

[30] Foreign Application Priority Data

Jul. 9, 1985 [JP]  Japan .................................. 62-150647

[51] Int. Cl.⁵ ............................................ H04M 1/66
[52] U.S. Cl. ...................................... 379/58; 455/58; 379/62
[58] Field of Search ............... 379/62, 63, 58; 455/54, 455/56, 58

[56] References Cited

U.S. PATENT DOCUMENTS

| | | | |
|---|---|---|---|
| 3,934,095 | 1/1976 | Matthews et al. | 379/67 |
| 4,006,316 | 2/1977 | Bolgiano | 379/199 |
| 4,099,033 | 7/1978 | Murray | 379/188 |
| 4,429,188 | 2/1984 | Allen | 379/188 |
| 4,436,957 | 3/1984 | Mazza et al. | 379/62 |
| 4,559,417 | 12/1985 | Komuro et al. | 379/199 |
| 4,585,904 | 4/1986 | Mincone et al. | 379/112 |
| 4,724,537 | 2/1988 | Mopet | 379/58 |

FOREIGN PATENT DOCUMENTS

| | | | |
|---|---|---|---|
| 57-24153 | 2/1982 | Japan | 379/199 |
| 0138134 | 8/1983 | Japan | 179/2 EA |
| 2086187 | 5/1982 | United Kingdom | 179/90 D |

OTHER PUBLICATIONS

Millicom Cellular Portable Telephone Advertisement, 11/21/84.

*Primary Examiner*—Robert Lev
*Attorney, Agent, or Firm*—Guy W. Shoup; Paul J. Winters; Stephen L. Malaska

[57] ABSTRACT

Disclosed is a method of locking the functions of a mobile telephone system. At least two lock codes are stored in a memory together with the functions to be kept locked or actuated when the locked state of the mobile system is released. The locked state of the automobile is not released unless a registered lock code is input. When the locked state is released by inputting one of the registered lock codes, some functions remain in the locked state in accordance with the input lock code, while other functions are actuated. Thus it is possible to limit the use of the mobile telephone system depending upon who drives the car.

6 Claims, 5 Drawing Sheets

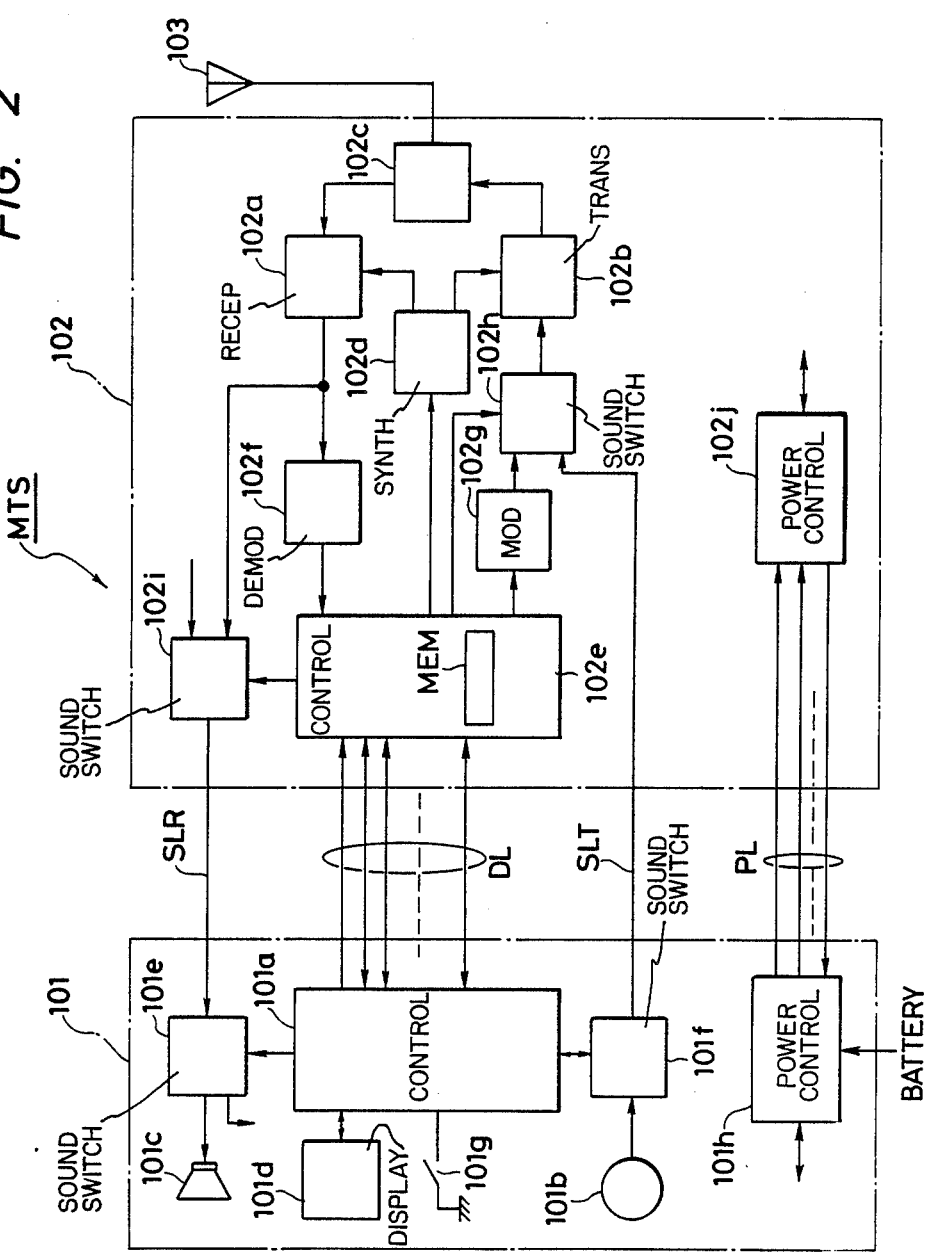

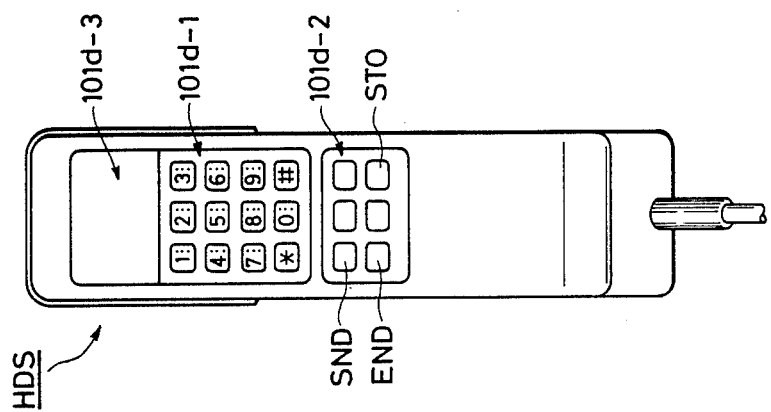
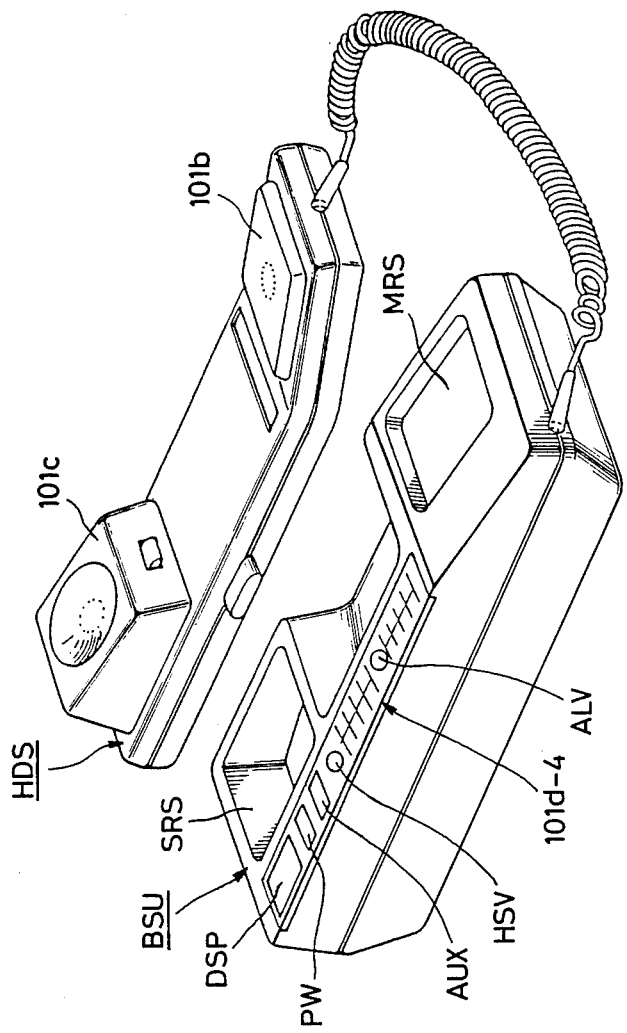

METHOD OF LOCKING FUNCTION OF MOBILE TELEPHONE SYSTEM

This application is a continuation of application Ser. No. 102,254, filed Sept. 28, 1987, which is a continuation of U.S. patent application Ser. No. 881,905, filed July 3, 1986, both now abandoned.

BACKGROUND OF THE INVENTION

1. Field of the Invention

The present invention relates to a method of locking the functions of a mobile telephone system, and more particularly, to a method of locking the functions of a mobile telephone system in which at least two lock codes are stored and when releasing the locked state, keeping some functions in the locked state in accordance with the lock code and actuating the other functions.

2. Description of the Prior Art

Mobile telephone systems have increasingly come into general use with the current extensive use of the automobile and the need to conduct business expeditiously, as well as from the viewpoint of security, and so forth. A mobile telephone system which is called the cellular system has been developed and come into wide use, especially in the U.S.A. The cellular system is a method of communicating with receivers at various stations by dividing a service area into a plurality of cells of about 6.4 Km in radius, in each of which a wireless telephone station (base station) is provided. Telephone calls are operated by wireless contact between successive base stations in a service area and the telephone provided within a car as the car travels to different areas. This system enables communication over a wide area, as well as allowing the number of channels to be increased, and the number of circuits to be increased without limit.

In such a cellular mobile telephone system, it is possible to communicate with a caller and also to make an external call from the mobile telephone system to an outside station while the ignition switch and the power switch are kept on.

Furthermore, the cellular system telephone system enables all the functions of the mobile telephone system to be kept in the locked state (non-actuated state) in which it is impossible to answer any call or to call any person until a predetermined lock code is input.

However, in a conventional mobile telephone system, which has only one kind of lock code, it is impossible for someone to use all the functions of the mobile telephone system and for others to use a limited number of functions.

For example, it is convenient if it is possible that (a) the owner of the car can use all the functions of the mobile telephone system without limitation, e.g., to call any number, even a long-distance one and to answer any call, while (b) the owner's family and friends have the ability solely to call local telephone numbers, not long-distance ones, and have no ability to answer any long-distance call (since the fee is paid by the receiver in U.S.A). It is impossible, however, for a conventional telephone system to answer such a demand.

SUMMARY OF THE INVENTION

Accordingly, it is an object of the present invention to provide a method of locking the function of a mobile telephone system by using different input codes to unlock different functions of the telephone system depending upon which code is known to the user.

To achieve this aim, a method of locking the functions of a mobile telephone system according to the present invention adopts a mobile telephone system having the following structure.

Referring to FIG. 1, which is a schematic block diagram of a method according to the present invention, the symbol MTS denotes a mobile telephone system.

The mobile telephone system MTS includes a control unit 101, a transceiver unit 102, and an antenna 103.

The control unit 101 includes a control portion 101a, a microphone 101b, a speaker 101c, an operation and display portion 101d, etc.

The control unit 101 and the transceiver unit 102 are connected by a plurality of power control lines, digital data transmitting/receiving lines, sound lines, etc, such as to allow communication between the two.

The operation and display portion 101d of the control unit 101 is provided with keys for keeping the telephone system in the locked state and keys for inputting a lock code.

Each lock code is stored in the memory MEM of the transceiver unit 102.

A first lock code which is intrinsic to the telephone system is predetermined and invariable. The functions of the mobile telephone system which are kept in the locked state in correspondence with a lock code (hereinunder referred to as a "second lock code") are stored in advance in the memory MEM of the mobile telephone system by operating the keys provided on the operation and display portion 101d of the control unit 101.

Before the power of the mobile telephone system is turned off, the mobile telephone system is locked by operating the lock key provided on the operation and display portion 101d. Thereafter it is impossible to release the locked state even if the power is turned on unless a lock code is input. As a result, no one can use the mobile telephone system without knowing the lock code.

If the first lock code is input to release the locked state, it is possible thereafter to use the mobile telephone system without any limitation.

On the other hand, if the second lock code is input to release the locked state, the mobile telephone system can then be used with some limitations. For example, it is possible to utilize the mobile telephone system except for those functions (e.g., long-distance calls) which are registered in advance in relation to the second lock code.

In other words, according to the present invention, it is possible to restrict the functions of the mobile telephone system depending upon whether the driver knows the first lock code or the second lock code.

The above and other objects, features and advantages of the present invention will become clear from the following description of the preferred embodiment thereof, taken in conjunction with the accompanying drawings.

BRIEF DESCRIPTION OF THE DRAWINGS

FIG. 2 is a block diagram of a mobile telephone system to which the method of locking the functions of a mobile telephone system according to the present invention is applied;

FIG. 3 is an external view of a control unit;

FIG. 4 is a view of the surface of a handset; and

DESCRIPTION OF THE PREFERRED EMBODIMENT

Figure 1:
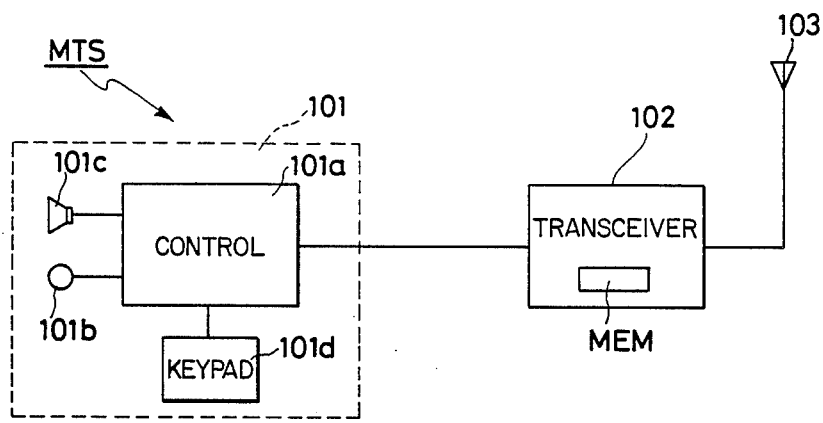
FIG. 1 is a schematic block diagram of the method of the present invention.

FIG. 2 is a block diagram of a system to which a method of locking the functions of a mobile telephone system is applied.

The symbol MTS denotes a cellular mobile telephone system, which includes a control unit 101, a transceiver unit 102, and an antenna 103.

The control unit 101 is, electrically, composed of a control portion 101a having a computer structure, a microphone 101b, a speaker 101c, an operation and display portion 101d, sound path switchers 101e, 101f, a hook switch 101g, and a power source control circuit 101h. The control unit 101 is, mechanically, composed of a handset HDS and a base unit BSU, as shown in FIG. 4.

The microphone 101b and the speaker 101c are provided on the reverse side of the handset HDS, and on the upper side thereof, are provided, as shown in FIG. 4, a ten-key portion 101d - 1, a function key portion 101d - 2, and a display portion 101d - 3.

Figure 5:
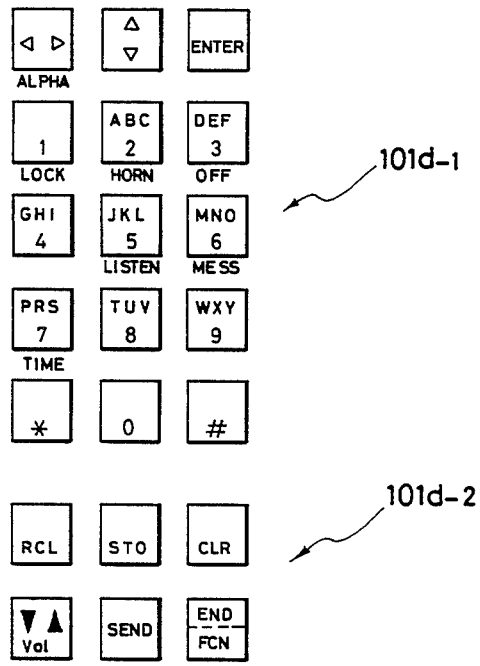
FIG. 5 is an enlarged view of a ten-key portion and a function portion.

The ten-key portion 101d - 1 and the function key portion 101d - 2 have various keys, as illustrated in the enlarged view in FIG. 5. The function key SEND is pressed after a dial number is input when calling someone, or when the telephone is called by someone. The function key END/FCN is operated at the end of a call, in locking the functions, or in inputting a lock code. The function key STO is operated when the input phone number is stored in a memory to be retrieved by input of a code number (speed dialing) or as a lock code. Numeral keys are charged with the respective functions indicated therebelow after the function key END/FCN is pressed. For example, the numeral key 1 then serves as a lock key.

The display portion 101d - 3 (FIG. 4) displays the dialled phone number and, when a lock code is input, it displays a question for setting a function.

The base unit BSU has, as shown in FIG. 3, a panel portion 101d - 4, a speaker receiving portion SRS and a microphone receiving portion MRS. The panel portion 101d - 4 is provided with an on/off power switch PW, an auxiliary switch AUX, an alert volume control portion ALV for controlling the speaker level of a ringing tone, a handset volume control portion HSV for controlling the volume of the receiving tone of the handset HDS and a display portion DSP for displaying various states (e.g., on-power state, locked state, or AUX state). The ten-key portion 101d - 1, the function key portion 101d - 2, the display portion 101d - 3 of the handset HDS together with the panel portion 101d - 4 of the base unit BSU constitute the operation and display portion 101d shown in FIG. 1.

The transceiver unit 102 (FIG. 2) includes a reception portion 102a, a transmission portion 102b, a duplexer 102c for connecting the antenna 104 to the reception portion or the transmission portion by appropriate change-over, a synthesizer 102d for producing a predetermined frequency signal, a control portion 102e, a demodulation portion 102f for demodulating digital data, a modulation portion 102g for modulating digital data, a sound path switcher 102h for changing over the sound from the microphone to digital data and outputting it, a sound path switcher 102i for changing over the sound signal from the reception portion 102a to a tone from a tone generator (not shown) and outputting it, and a power source control circuit 102j.

The control unit 101 and the transceiver unit 102 are connected to each other by a plurality of power control lines PL, digital data transmitting/receiving lines DL, a sound reception line SLR, a sound transmission line SLT, and the like.

The first lock code is invariable and has already been set in the MEM. The second lock code is set and registered in the memory MEM in the following way.

Figure 6:
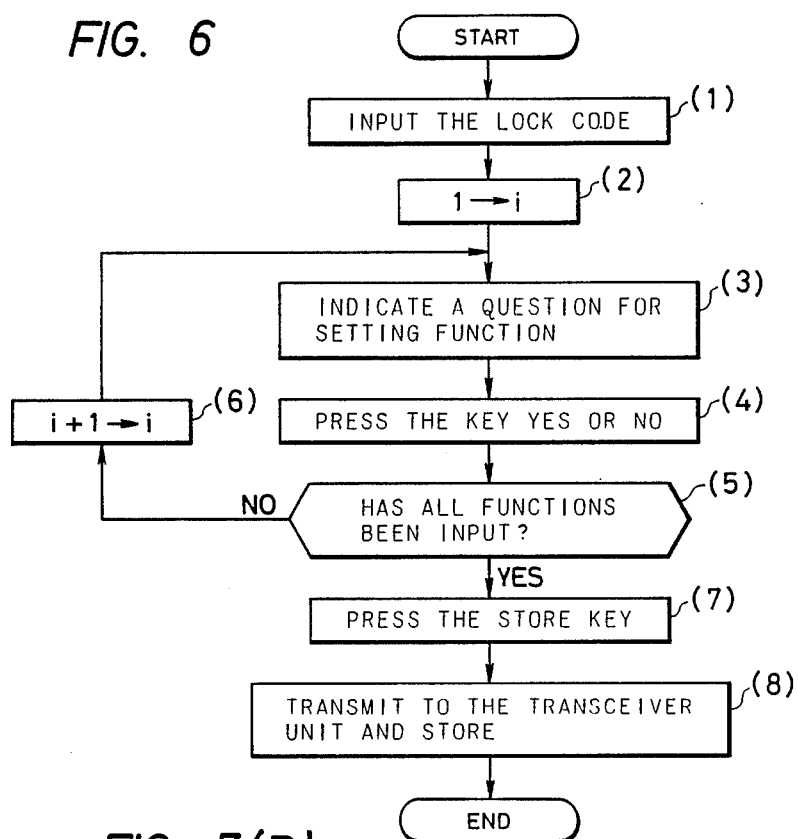
FIG. 6 is a flowchart of the process of setting a lock code.

The process for setting the second lock code will be explained with reference to FIG. 6.

(1) After the function key END/FCN on the handset HDS is pressed, the numeral key 1 (lock key) is pressed, and the lock code of three figures is next input.

(2) When the lock code is input, the control portion 101a of the control unit 101 sets 1 at "i".

(3) The control portion 101a displays the "i" th question for setting the function which corresponds to the lock code which has been input in the step (1). For example, question "Is a long-distance call possible?" is displayed.

(4) If the driver wants a long-distance call to be admitted, the key * on the operation and display portion 101d - 1 is pressed, whereas if he wants a long-distance call to be impossible, the key # is pressed.

(5) Judgement is made as to whether or not any function remains un-set.

(6) If YES, "i"+1 is set at "i" and the step (3) to (5) are repeated.

(7) If the setting of all the function has been completed, the function key STO on the operation and display portion 101d - 1 is pressed.

(8) The control portion 101a thereby transmits the input lock code and the set functions to the control portion 102e of the transceiver unit 102 through the data line DL so as to store them in the memory MEM.

Functions to be set are, for example, (a) long-distance call possible/impossible (b) local call possible/impossible (c) answer possible/impossible, and if possible, the key * is pressed (indicated by the numeral "1"), while if impossible the key # is pressed (indicated by the numeral "0"). For example, if a local call is only possible, the function code (a), (b), (c) is indicated by the numerals "0", "1", "1", and if answer is only possible, it is indicated by "0", "0", "1".

The setting of the second lock code has now been completed.

Figure 7B:
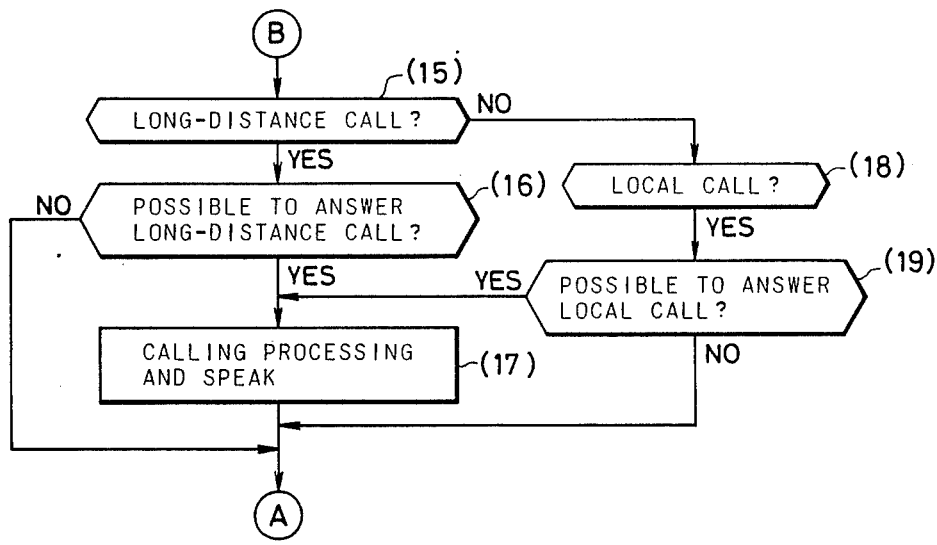
FIGS. 7A and 7B are flowcharts of the process of the method according to the present invention.
Figure 7A:
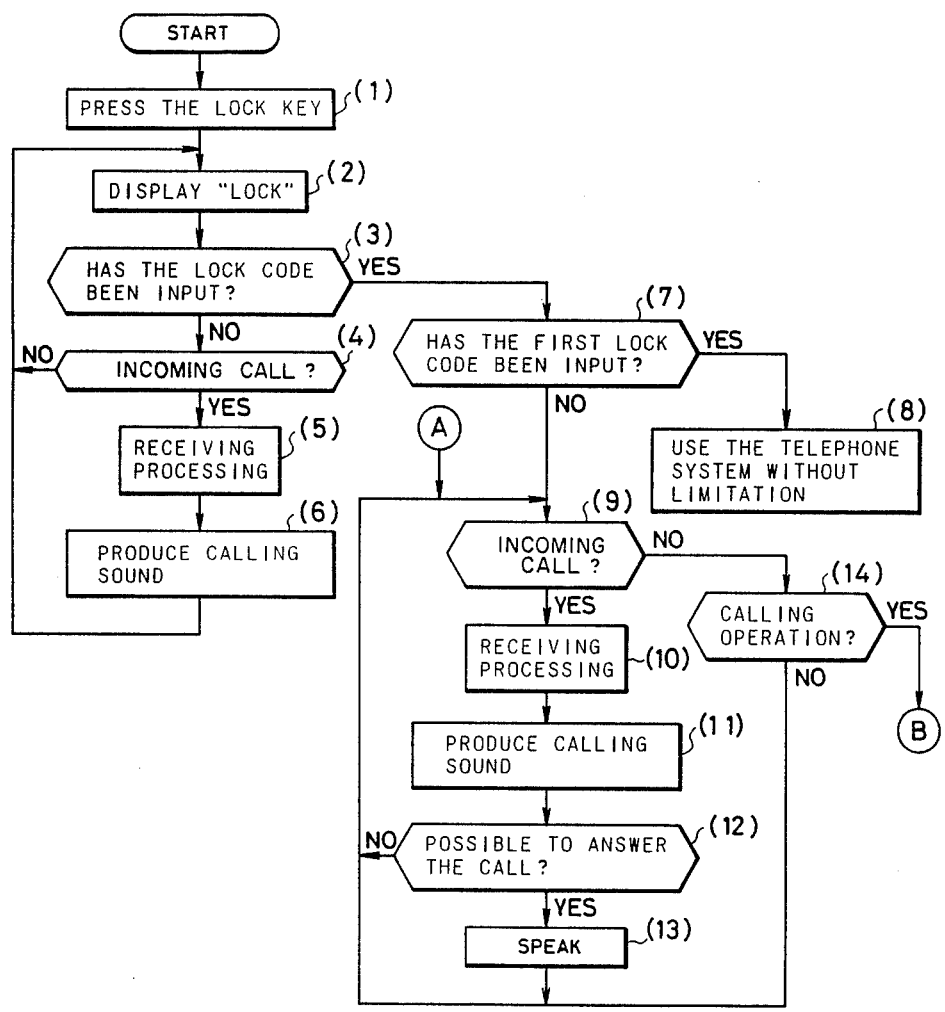

The method of releasing the locked state of the telephone system by inputting the first or second lock code will here be explained, with reference to FIG. 7.

(1) When the on/off power switch PW (FIG. 3) is on, the function key END/FCN and the numeral key 1 are pressed.

(2) The mobile telephone system is thereby locked and the message "LOCK" indicating that the system is in the locked state is displayed on the display portion DSP (FIG. 2).

(3) The control portion 102e of the transceiver unit 102 judges whether or not the predetermined lock code has been input in order to release the locked state.

(4) If the locked state has not been released, the control portion 102e judges whether or not a call has been received. If NO, the steps (2) to (4) are repeated.

(5) If YES, the control portion 102e of the transceiver unit 102 performs a receiving processing.

(6) The control portion 102e controls the sound path switchers 102i, 101e (FIG. 2) and sounds a ringing tone. However, even if the receiver is removed from the hook, in other words, even if a hook-off signal is produced, the line is not connected (the system is not engaged).

(7) On the other hand, if the locked state has been released by inputting the lock code in the step (3), judgement is made by the control portion 102e of the transceiver unit 102as to whether or not the locked state has been released by the input of the first lock code.

That is, if the first or second lock code is input by operating the ten-key portion 101d - 1 provided on the operation and display portion 101d, the lock code is transmitted to the control portion 102e of the transmission unit 102, which then judges whether or not the lock code agrees with the first or second lock code stored in the memory MEM.

If YES, the locked state is released, and the input lock code is the first lock code, the process proceeds to the step (8), whereas if it is the second lock code, the process proceeds to the step (9).

(8) If the input lock code is the first lock code, the mobile telephone system can be freely used without any limitation. This is because the person who can input the first lock code is the owner or a person who is permitted by the owner to use the telephone system in the same way as the owner.

(9) On the other hand, if the input lock code is the second lock code, the telephone system can be used with some restrictions. This is because a person who knows the second lock code is permitted by the owner to use the telephone system with some restrictions.

If the input lock code is the second lock code, judgement is made by the control portion 102e as to whether or not any call is received.

(10) If YES, the receiving processing is executed.

(11) A ringing tone is sounded.

(12) The function code corresponding to the second lock code is read from the memory MEM in order to judge whether it is possible to answer the external call.

If NO, even if the receiver is removed from the hook and a hook-off signal is produced, the telephone system is not engaged. The process then returns to the step (9).

(13) If it is possible to answer the call, the receiver is removed from the hook, a hook-off signal is produced by the hook switch 101g, whereby the control portion 102e connects the line in the engaged state. If the receiver is put back at the end of the call, the steps (9) to (13) are repeated.

(14) If the answer is NO in the step (9), namely, if no call has been received, judgement is made as to whether calling operation has been performed or not. In calling, after a phone number is input, the function key SEND is pressed. The input phone number and the send signal are transmitted from the control portion 101a of the control unit 101 to the control portion 102e of the transceiver unit 102.

Therefore, the control portion 102e can determine whether calling operation has been performed on not depending on whether the control position 102e has received a send signal or not.

(15) If NO, the steps (9) to (14) are repeated, while if YES, the control portion 102e judges whether or not the call is a long-distance call. It can be determined depending upon whether the head of the phone number is 0 or not, or by the length of the phone number.

(16) If it is a long-distance call, the control portion 102e checks the function code of the second lock code as to whether a long-distance code is possible or not.

(17) If YES, the calling processing is executed, and the process returns to the step (9) when the call is finished. If NO, on the other hand, the process proceeds to the step (9) without executing calling processing.

(18) If the call is a local call in the step (15), the control portion 102e checks the function code of the second lock code as to whether or not a local call is possible.

(19) If the local call is possible, calling processing is executed, and at the end of the call the process proceeds to the step (9). If the local call is impossible, on the other hand, the process proceeds to the step (9) without executing calling processing.

Although two lock codes are set in this embodiment, the number of lock codes is not limited to two. Similarly the three functions set in accordance with the lock code, namely local call, long-distance call, and answer, described in this embodiment are only illustrative and do not restrict the scope of the present invention.

As described above, in the method according to the present invention, at least two lock codes are stored in the memory together with functions which are to be kept in the locked state or activated in accordance with a lock code, and, when the locked state of the telephone system is released by inputting either of the stored lock codes, a predetermined function remains in the locked state in accordance with the input lock code. Accordingly, this method enables the use of the mobile telephone system to be limited depending upon who drives the car.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A method of selectively locking a plurality of functions of a mobile telephone system having an input keypad, a memory, a control portion for controlling operation of the functions of the mobile telephone system, and an on/off power switch, comprising the steps of:

storing, in advance, a first lock code in the memory;

storing, in advance, at least one, second lock code in the memory;

providing, in the control portion, all of said functions of the mobile telephone system in a first operational mode, and less than the total number of said functions of the mobile telephone system in a second operational mode;

assigning said first lock code to a first user who is to be allowed access to all of said functions of said mobile telephone system;

assigning a second lock code to a second user who is to have access to a different set of said functions in the form of said less than the total number of said functions;

locking all of said functions of said mobile telephone system when said on/off power switch is turned on;

comparing an input lock code keyed in by a user to determine if said first lock code or said second lock code has been provided by the user;

unlocking all of said functions of said mobile telephone system to allow unlimited use by said user in the first operational mode if the first lock code assigned to said first user is provided;

unlocking said different set of said functions corresponding to the previously assigned second lock code of a said second user to allow use of said different set of said functions in the second operational mode if said assigned second lock code is provided.

2. A method of locking a plurality of functions of a mobile telephone system according to claim 1, wherein said plurality of functions constitutes more than three functions.

3. A method of selectively locking the functions of a mobile telephone system according to claim 1, further comprising the step of instructing said control portion to keep the telephone system locked from transmitting long-distance telephone calls in the second operational mode when a second lock code has been provided.

4. A method of selectively locking the functions of a mobile telephone system according to claim 1, further comprising the step of instructing said control portion to keep the telephone system locked from transmitting local telephone calls in the second operational mode when a second lock code has been provided.

5. A method of selectively locking the functions of a mobile telephone system according to claim 1, further comprising the step of instructing said control portion to keep the telephone system locked from receiving telephone calls in the second operational mode when a second lock code has been provided.

6. A method of selectively locking the functions of a mobile telephone system according to claim 1 wherein the telephone system has a display portion, and further comprising providing an instruction setting mode including displaying questions to prompt the owner of the vehicle to provide instructions to said control portion, and storing answer codes provided by the owner in response to the displayed questions for instructing said control portion to keep the telephone system locked for different functions in the second operational mode when a second lock code has been provided.

* * * * *